Aug. 10, 1943.  C. H. YOUNG  2,326,274
ELECTRIC MEASURING APPARATUS
Filed Feb. 27, 1941
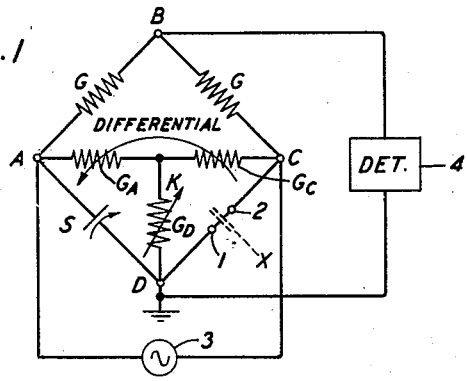
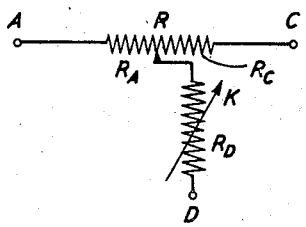
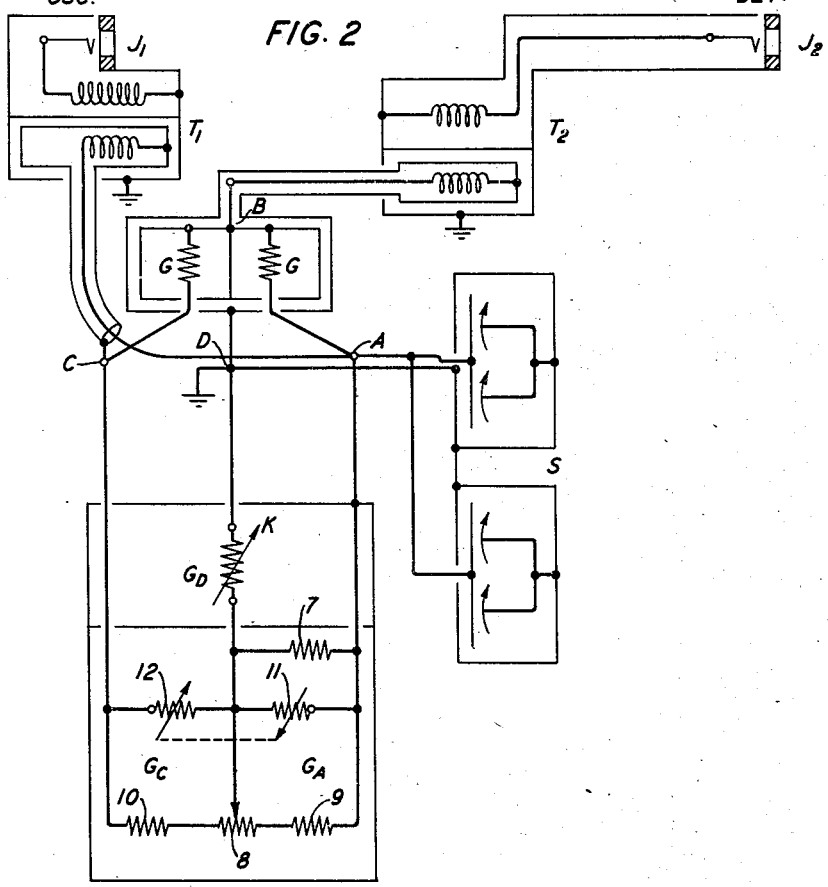
INVENTOR
C. H. YOUNG
BY G. H. Heydt
ATTORNEY Patented Aug. 10, 1943

2,326,274

UNITED STATES PATENT OFFICE 2,326,274

ELECTRIC MEASURING APPARATUS

Clarence H. Young, Lincoln Park, N. J., assignor to Bell Telephone Laboratories, Incorporated, New York, N. Y., a corporation of New York Application February 27, 1941, Serial No. 380,771

7 Claims. (Cl. 175—183)

This invention relates to electric bridges and more particularly to a conductance standard for such bridges.

It is the object of this invention to provide for an electric bridge a conductance standard having small increments of conductance as well as small residual conductances in the measuring arms.

It is the further object of this invention to provide for an electric bridge a conductance standard of very wide range but capable of being more easily and rapidly adjusted than conductance standards of moderate range heretofore known.

The foregoing objects are attained by this invention which provides a conductance standard comprising a three-branch star-connected conductance network containing conductances of sizes easily made to precision so connected to three terminals of an electric bridge as to provide the measuring arms with very much smaller effective conductances.

The invention may be better understood by referring to the accompanying drawing in which:

Fig. 1 discloses the essential elements of this invention as applied to one form of bridge;

Fig. 2 discloses a practical embodiment of the invention in a bridge of the general type disclosed in Fig. 1; and Fig. 3 discloses a modification of the invention.

Referring now more particularly to Fig. 1 wherein is disclosed an ordinary alternating current electric bridge having four terminals A, B, C and D, respectively. The ratio arms may be equal, but not necessarily so, and contain conductances G, G. A variable standard capacitor S may be included in one of the measuring arms AD, as shown, and the other measuring arm may be provided with test terminals 1, 2 for the insertion of some unknown capacitance X.

The bridge is supplied at its AC terminals with an alternating voltage from alternating current source 3 which may, for convenience, be a variable frequency oscillator. A suitable balance detector 4 is connected to the conjugate points BD.

Phase impurities are known to exist in practically all capacitors and in accordance with this invention the magnitude of these phase impurities may be measured in terms of conductance. These conductances for most small capacitors, particularly at low frequencies, are quite small, and, if it is attempted to balance them directly, it is found that the balancing conductances must likewise be quite small, so small in fact as to be frequently impossible of accurate manufacture.

In the bridge shown in Fig. 1 this difficulty is obviated by means of a star-connected conductance standard comprising conductance branches $G_A$, $G_C$ and $G_D$. The conductances $G_A$ and $G_C$ have their extremities connected to the A and C corners of the bridge, respectively, and are adapted for differential adjustment. That is to say, as conductance is removed from $G_A$ it is added to $G_C$, and vice versa. Conductance $G_D$ has its extremity connected to the D corner of the bridge and is also adjustable but independently of conductances $G_A$ and $G_C$.

While the invention has been described in connection with a particular type of capacitance bridge, it is evident to those skilled in the art that the star-connected conductance standard of this invention may be applied to other types of electric bridges including direct current bridges.

For purposes of analysis, the star network of conductances in Fig. 1 may be transformed into an equivalent delta network whereupon it will be seen that one conductance appears across AC and therefore does not enter into the balance equation. The other two branches of the equivalent delta will be in the AD and CD arms of the bridge and are, therefore, of interest. At balance, the total effective conductances including the unknown in the two measuring arms AD and CD must be equal as is well known. The equivalent standard conductance effective in the AD arm will be the difference between the equivalent transformed conductance in the AD arm and the equivalent transformed conductance in the CD arm and can be shown mathematically to be equal to $$G_S = \left[ \frac{G_D}{(G_A + G_C) + G_D} \right] [G_A - G_C] \qquad (1)$$

where:

$G_S$ is the equivalent standard conductance effective in the AD arm of Fig. 1;

$G_A$, $G_C$, $G_D$ are the actual conductances of the three star-connected branches as indicated in Fig. 1.

In accordance with this invention, the sum of conductances $G_A$ and $G_C$ is kept constant. Stated otherwise, these two conductances are adapted for differential action so that simultaneously with the increase or decrease of conductance at $G_A$ there is always a corresponding decrease or increase, respectively, at $G_C$. Referring again to Equation 1, it will be observed that the quantity in the first bracket will remain a constant while the quantity in the second bracket is a variable function of the adjustment of differential conductances $G_A$ and $G_C$. Moreover, by adjusting $G_D$ the constant in the first bracket can be made any desirable decimal fraction, between the limits of zero and unity, so as to make possible a series of convenient multiplying factors K such as 1, 0.1, 0.01, 0.001, etc.

As a practical illustration of what may be done with such a standard, assume that $G_A$ and $G_C$ are differentially adjustable in 10 micromho steps, that is, as 5 micromhos is removed from or added to $G_A$ there is added to or removed from $G_C$ a corresponding 5 micromhos. Assume, further, that the sum of the conductances $G_A$ and $G_C$ is 5000 micromhos and that $G_D$ is 5.005 micromhos. This will yield a multiplying factor $K$ of 0.001. The 10 micromhos steps are thereby rendered effectively 0.01 micromho steps thereby making it possible to use standard conductances of sizes, which can be accurately made, to measure very much smaller conductances.

Fig. 2 shows one form of a practical embodiment of the invention in an alternating current bridge showing suitable shielding. Bridge terminals A, C and D are shown accessible. The oscillator is coupled to the AC corners through jack $J_1$ and shielded transformer $T_1$ while the detector is coupled to conjugate points BD through jack $J_2$ and shielded transformer $T_2$. The ratio arms may contain equal conductances G, G and are shielded as shown. Conductances G, G may be made unequal if desired provided their phase angles are maintained equal. A shielded capacitance standard S is shown connected to the AD bridge corners. The unknown capacitance which may contain phase impurity is connected to the bridge between terminals C and D.

As in Fig. 1, the conductance standard is made up of a star-connected network of conductances denoted generally $G_A$, $G_C$ and $G_D$. $G_A$ comprises conductances 7, 9, 11 and a portion of conductance 8. $G_C$ comprises conductances 10, 12 and the remaining portion of conductance 8. As described in connection with Fig. 1, conductance $G_D$ is made adjustable so as to provide suitable decimal multiplying factors K. In order to prevent the conductance standard from appearing negative, conductance 7 is added to $G_A$ and is preferably of such magnitude as to be equal to the maximum value of conductance 11. Conductances 11 and 12 act differentially in the manner previously described and to facilitate reading their values these conductances are preferably caused to change in decade steps.

Smaller conductance increments may be provided by the network comprising conductances 8, 9 and 10.

Conductance 8 has been shown in the form of a potentiometer and in a practical embodiment it can be made as a slide wire if its conductance is large compared with the conductance of 9 and 10. This can best be shown by converting the conductances into resistances so that:

$$G_A = G_7 + G_{11} + \frac{1}{R-r} \quad (2)$$

where:

$R$ = one-half the sum of the resistance of 8, 9 and 10,
$r$ = change in resistance from balance due to moving the slider of 8,
$G_7$ = conductance of 7, and
$G_{11}$ = conductance of 11.

$$G_C = G_{12} + \frac{1}{R+r} \quad (3)$$

where:

$G_{12}$ = conductance of 12.

$$G_A - G_C = (G_7 + G_{11} - G_{12}) + \left(\frac{1}{R-r} - \frac{1}{R+r}\right) \quad (4)$$

Since the conductances are additive, the quantity in the second parenthesis represents the variation of conductance as a function of $r$. This quantity can be shown equal to:

$$\left(\frac{1}{R-r} - \frac{1}{R+r}\right) = \frac{2r}{R^2}\left[\frac{1}{1-\left(\frac{r}{R}\right)^2}\right] \doteq \frac{2r}{R^2}\left[1+\left(\frac{r}{R}\right)^2\right] \doteq \frac{2r}{R^2} \quad (5)$$

This indicates that if resistance $r$ is small compared with resistance R, the quantity in the second parenthesis of Equation 4 is practically a linear function of the change in resistance of slide wire 8.

It can be shown by a similar process that:

$$G_A + G_C = (G_7 + G_{11} + G_{12}) + \frac{2}{R}\left[\frac{1}{1-\left(\frac{r}{R}\right)^2}\right] \doteq$$

$$(G_7 + G_{11} + G_{12}) + \frac{2}{R} \doteq \text{constant} \quad (6)$$

Expression 6 demonstrates that variation of $r$ has substantially no effect upon the sum $G_A + G_C$ in Equation 1 while Expressions 4 and 5 demonstrate that the quantity $G_A - G_C$ in Equation 1 is substantially a linear function of $r$. Therefore, slide wire 8 may be calibrated directly in terms of conductance as a linear function of the change in slide wire resistance.

The use of this bridge as above described is predicated primarily upon the assumption that the sum of the conductances $G_A + G_C$ is maintained constant. It has been found, however, that when conductance $G_D$ is small compared with the sum of the two differential conductances $G_A$ and $G_C$, that $G_A$ and $G_C$ may be made in the form of a slide wire R as shown schematically in Fig. 3. This must be understood to be a special case of the generalization previously made. It is the special case where the conductance $G_D$ is small compared with the sum of the conductances $G_A$ and $G_C$. Under such circumstances the slide wire R may be calibrated directly in conductance units.

The validity of this special case can best be demonstrated by converting conductances $G_A$, $G_C$ and $G_D$ in Equation 1 into their corresponding resistances by taking their reciprocals. This will result in the following expression:

$$G_S = \frac{R_C - R_A}{R_D(R_A + R_C) + R_A R_C} \quad (7)$$

where:

$R_A$, $R_C$ and $R_D$ are the reciprocals of conductances $G_A$, $G_C$ and $G_D$, respectively.

Resistance $R_A$ plus resistance $R_C$ is equal to the total resistance R of the slide wire as shown in Fig. 3. This, of course, is a constant quantity and if, as assumed, $R_D$ is large compared with R the maximum value of the product $R_A R_C$ may be regarded as negligible compared with the product $R_D(R_A + R_C)$, and Equation 7 becomes:

$$G_S = \frac{R_C - R_A}{R_D(R_A + R_C)} \quad (8)$$

Equation 8 may be further simplified to the following expression:

$$G_S = \frac{R - 2R_A}{R R_D} \quad (9)$$

where:

$$R = R_A + R_C$$

Equation 9 shows that under the conditions assumed conductance $G_S$ is a linear function of resistance $R_A$ and the slide wire may be calibrated directly in conductance units. Equation 9 also shows that the multiplying factor is provided by the value of resistance $R_D$ and as before may be made, for convenience, a series of decimal fractions.

What is claimed is:

1. In an electric bridge having four terminals, a conductance standard therefor comprising a star-connected conductance network having three branches, two of which are adapted for differential adjustment, and the third of which is separately adjustable, and means connecting the differentially adjustable branches to two opposite bridge terminals and the third branch to one of the remaining bridge terminals.

2. In an electric bridge having two pairs of conjugate terminals, a conductance standard therefor comprising a star-connected conductance network having three branches, two of said branches each comprising a plurality of conductance elements adapted for differential adjustment in decade steps between said two branches, the third branch comprising a separately adjustable conductance adapted to provide a decimal series of multiplying factors, and means connecting the differentially adjustable branches to one pair of conjugate bridge terminals and the third branch to one of the remaining bridge terminals.

3. In an electric bridge having four terminals, a conductance standard therefor comprising a star-connected conductance network having three branches, two of which are adapted for differential adjustment in decade steps and the third branch of which is separately adjustable, and means connecting the differentially adjustable branches to two opposite bridge terminals and the third branch to one of the remaining bridge terminals.

4. In an electric bridge having four terminals, a conductance standard therefor comprising a star-connected conductance network having three branches, two of which are adapted for differential adjustment in decade steps, the third branch comprising a separately adjustable conductance adapted to provide a decimal series of multiplying factors, and means connecting the differentially adjustable branches to two opposite bridge terminals and the third branch to one of the remaining bridge terminals.

5. The combination defined in claim 4 in which the two differentially adjustable branches include three series-connected conductances bridged thereacross, the intermediate conductance being large compared with the other two and being arranged for continuous differential adjustment between said two branches.

6. In an electric bridge having four terminals, a conductance standard therefor comprising a star-connected conductance network having three branches, two of which are adapted for continuous differential adjustment, the sum of the conductances whereof is large compared with the conductance of the third branch, and means connecting the differentially adjustable branches to two opposite bridge terminals and the third branch to one of the remaining bridge terminals.

7. The combination defined in claim 6 in which the third branch comprises a separately adjustable conductance adapted to provide a decimal series of multiplying factors.

CLARENCE H. YOUNG.